(12) United States Patent
Campbell

(10) Patent No.: US 8,074,595 B2
(45) Date of Patent: *Dec. 13, 2011

(54) MACHINE FOR MAKING AN ANTI-STATIC TIRE TREAD

(75) Inventor: William G. Campbell, Gallatin, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 206 days.

This patent is subject to a terminal disclaimer.

(21) Appl. No.: 12/568,037

(22) Filed: Sep. 28, 2009

(65) Prior Publication Data

US 2010/0018456 A1 Jan. 28, 2010

Related U.S. Application Data

(60) Continuation of application No. 11/451,211, filed on Jun. 12, 2006, now Pat. No. 7,610,873, which is a division of application No. 10/235,474, filed on Sep. 4, 2002, now abandoned.

(60) Provisional application No. 60/317,000, filed on Sep. 4, 2001.

(51) Int. Cl.
 *B29D 30/52* (2006.01)
 *B32B 38/04* (2006.01)

(52) U.S. Cl. ......... 118/35; 118/211; 118/212; 118/216; 152/152.1; 152/209.5; 152/DIG. 2; 156/406.4

(58) Field of Classification Search ............ 118/35, 118/211, 212, 216; 29/895.31; 301/44.3; 101/24; 152/152.1, 209.5, DIG. 2; 156/406.4
See application file for complete search history.

(56) References Cited

U.S. PATENT DOCUMENTS

| | | | | |
|---|---|---|---|---|
| 886,933 | A | * | 5/1908 | Rohlf .............................. 211/123 |
| 1,066,314 | A | * | 7/1913 | Patchett et al. .................. 101/24 |
| 1,849,407 | A | * | 3/1932 | McKee ............................ 101/24 |
| 1,945,700 | A | * | 2/1934 | O'Brien et al. ................ 156/435 |
| 2,907,365 | A | * | 10/1959 | MacDonald ............. 152/DIG. 3 |
| 3,006,317 | A | * | 10/1961 | Showalter ....................... 118/212 |
| 3,534,681 | A | * | 10/1970 | Beals et al. ...................... 101/37 |
| 4,678,694 | A | * | 7/1987 | Claessen ......................... 427/289 |
| 5,169,483 | A | * | 12/1992 | Tokunaga et al. ............. 156/410 |
| 7,610,873 | B2 | * | 11/2009 | Campbell ......................... 118/35 |
| 2003/0089436 | A1 | * | 5/2003 | Lanzarotta et al. ......... 152/152.1 |

FOREIGN PATENT DOCUMENTS

| EP | 881060 | * | 12/1998 |
|---|---|---|---|
| EP | 895877 | * | 2/1999 |

* cited by examiner

*Primary Examiner* — Steven D Maki

(57) ABSTRACT

A method of providing an extruded tire tread (T) with antistatic properties. In this method, a pin (10) is coated with an electrically conductive material (M). The coated pin (10) pierces the tire tread (T) to form an opening (12) of the desired depth and then is withdrawn. During withdrawal of the pin (10), the material (M) remains in the pierced opening (12) so that a conductive body (14) is formed in the tire tread (T). The pin (10) can then be re-coated with the material (M) and the cycle repeated to produce a plurality of conductive bodies (14) in the tire tread (T).

20 Claims, 4 Drawing Sheets

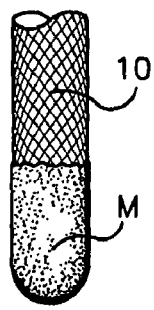
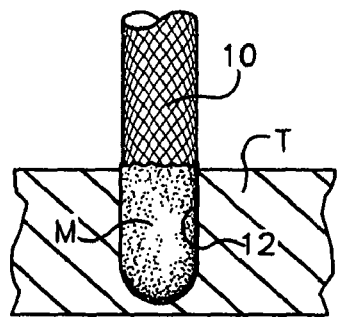
Figure 1A    Figure 1B
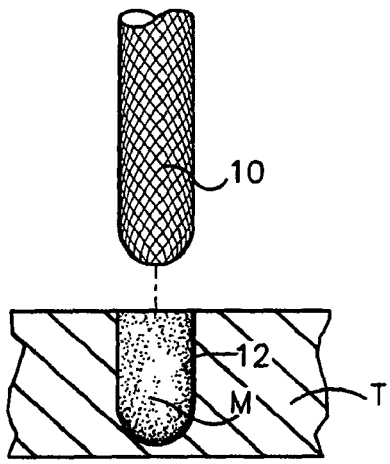
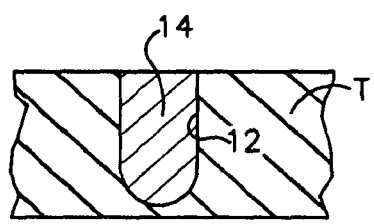
Figure 1C    Figure 1D
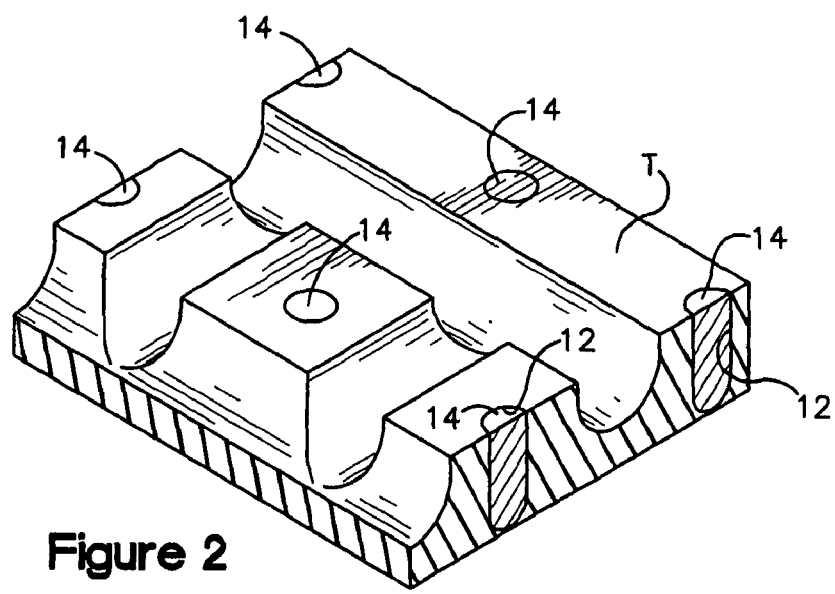
Figure 2

MACHINE FOR MAKING AN ANTI-STATIC TIRE TREAD

CROSS REFERENCE TO RELATED APPLICATIONS

This application is a continuation of U.S. Application Ser. No. 11/451,211 filed on Jun. 12, 2006, which is a divisional of U.S. Application Ser. No. 10/235,474 filed on Sep. 4, 2002, which claims priority to U.S. Provisional Application No. 60/317,000 filed on Sep. 4, 2001. The disclosures of all of the above applications are incorporated by reference herein in their entirety.

FIELD OF THE INVENTION

The present invention relates to a method for making an anti-static tire tread and a machine for performing this method.

BACKGROUND OF THE INVENTION

During operation of a vehicle, electric charge can be conducted to earth through the tires provided that the tires have a sufficient level of conductivity. Without this conductivity, a moving vehicle is susceptible to the build-up of static electric charge which can negatively affect electronic circuitry, interfere with radio reception, create unwanted sparks, and/or cause personal discomfort. Tires are constructed of natural and synthetic rubbers which are electrical insulators. Accordingly, conductive materials (e.g., carbon black mix) are commonly introduced into a tire to increase its electrical conductivity and thereby avoid the build-up of static electric charge. For example, in a method disclosed in U.S. Pat. No. 6,183,581, a carbon black mix in a volatile liquid is poured into through-holes in a central region of a tire tread. When the volatile liquid evaporates, the carbon black mix is left inside the holes to create electrically conducting bodies which form electrical bridges between the tire's rolling surface and its carcass. The entire disclosure of this patent is hereby incorporated by reference.

SUMMARY OF THE INVENTION

The present invention provides a method for making an anti-static tire tread comprising the steps of coating a pin with an electrically conductive material, piercing the tire tread with the coated pin to form an opening, and withdrawing the pin from the now-formed opening in the tire tread. The electrically conductive material remains within the opening during the withdrawing step so that an electrically conductive body is formed in the tire tread. The electrically conductive material can be a liquid (e.g., carbon black mix in a volatile liquid) that forms an electrically conductive body upon evaporation. Alternatively, the electrically conductive material can be a dry mixture, such as powder (e.g., carbon black mix powder).

The coating, piercing and withdrawing steps can be continuously repeated and a plurality of pins can be sequentially coated, used to pierce the tire tread, and then withdrawn. For example, the plurality of pins can be mounted on the circumference of a wheel which is turned by movement of the tire tread, preferably at fixed distances so that piercing will occur at regular intervals. The pins can be attached to an adapter rim for the wheel and can comprise the distal portion of screws threaded into openings on the rim or posts press-fit into openings on the rim. The pins can be arranged in a single row or in a plurality of staggered or aligned rows. A transfer reel, which is turned by rotation of the wheel, can be used to coat the pins prior to the piercing step.

The piercing step can be performed on a central region of the tire tread and in such a manner that the electrically conductive body can form a continuous electrical path (or a bridge) between a rolling surface and a carcass of a tire.

These and other features of the invention are fully described and particularly pointed out in the claims. The following descriptive annexed drawings set forth in detail a certain illustrative embodiment of the invention, this embodiment being indicative of but one of the various ways in which the principles of the invention may be employed.

DRAWINGS

FIGS. 1A-1D are schematic views of the steps of a method of introducing a conductive material into a tire tread according to the present invention.

FIG. 2 is a schematic view of a tire tread into which conductive material has been introduced by the method of the present invention.

DETAILED DESCRIPTION

Figure 3:
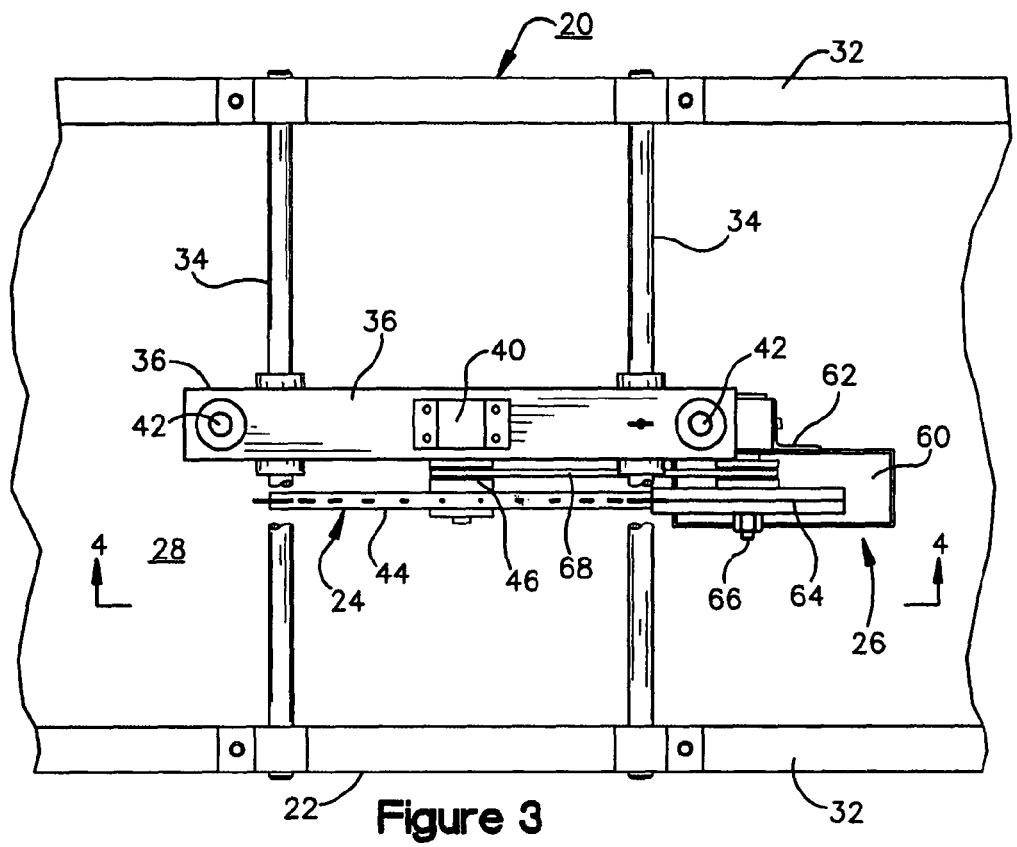
FIG. 3 is a top view of a machine for making an anti-static tire tread according to the present invention.

Referring now to the drawings, and initially to FIGS. 1A-1D, a method of making an anti-static tire tread according to the present invention is shown. In this method, a pin 10 is coated with an electrically conductive material M. (FIG. 1A.) The coated pin pierces an extruded tire tread to form an opening 12 of the desired depth. (FIG. 1B.) The coated pin 10 is then withdrawn and the material M remains in the pierced opening 12 of the tire tread T. (FIG. 1C.) If the conductive material M is a liquid (e.g., carbon black mix in a volatile liquid) it forms a conductive body 14 upon evaporation. If the conductive material M is a dry mixture (e.g., carbon black mix powder), the powder remains in the pierced opening 12 to form the electrically conductive body 14. (FIG. 1D.) The pin 10 can then be re-coated with the material M and the cycle repeated to produce a plurality of conductive bodies 14.

Referring now to FIG. 2, a central region the tire tread T is shown after a plurality of conductive bodies 14 have been formed therein. The electrically conducting bodies 14 are uniformly spaced and of a sufficient depth so that they will form a continuous electrical path between the rolling surface and the carcass of the tire. In the preferred embodiment, each electrically conducting body 14 is made from a carbon black mix with an electrical resistivity of less than $10^9$ ohms×cm.

Figure 4:
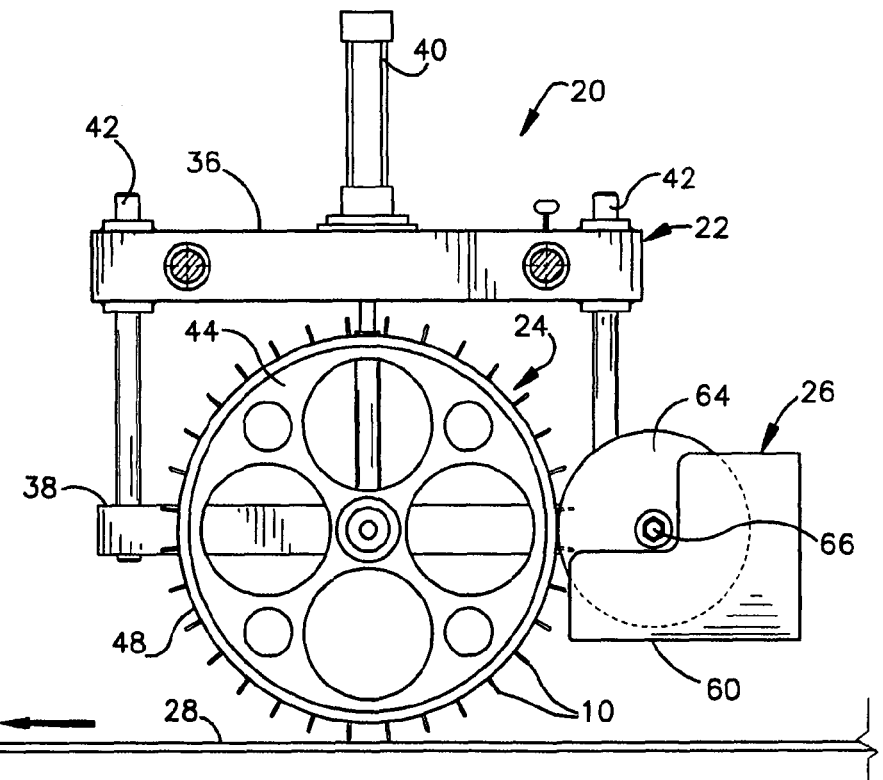
FIG. 4 is a front view of the machine.

Referring additionally to FIGS. 3 and 4, a machine 20 for performing the methods of the present invention is shown. The machine 20 comprises a frame 22, a wheel assembly 24, and a supply system 26. The frame 22 positions the wheel assembly 24 above a conveyor 28 for the tire tread T. The wheel assembly 24 supports the pins 10 and moves them to perform the piercing and withdrawing steps. The supply system 26 coats the pins 10 with the electrically conductive material M prior to the piercing and withdrawing steps.

The illustrated frame 22 comprises end members 32 positioned on either side of the conveyor 28, shafts 34 extending between the end members 32, and a top member 36 extending between the shafts 34. The top member 36 can be selectively slidable on the shafts 34 for transverse positioning of the wheel assembly 24 relative to the tire tread T. The frame 22 can include a lift for raising and lowering the wheel assembly 24 relative to the conveyor 28. For example, the illustrated lift comprises a lift bar 38, a cylinder 40 coupled to the lift bar 38, and guide rods 42 attached to the lift bar 38 and slidably received by the top frame member 36.

The wheel assembly 24 comprises a wheel 44 and a spindle 46 rotatably mounting the wheel 34 to the lift bar 38. The wheel 44 is positioned relative the tread conveyor 28 so that it will be turned by the action of the tread T passing therebeneath. The pins 10 are mounted on the circumference of the wheel 44 at fixed distances so that the turning of the wheel 44 will cause the pins 10 to pierce the tread T at regular intervals.

Figure 5:
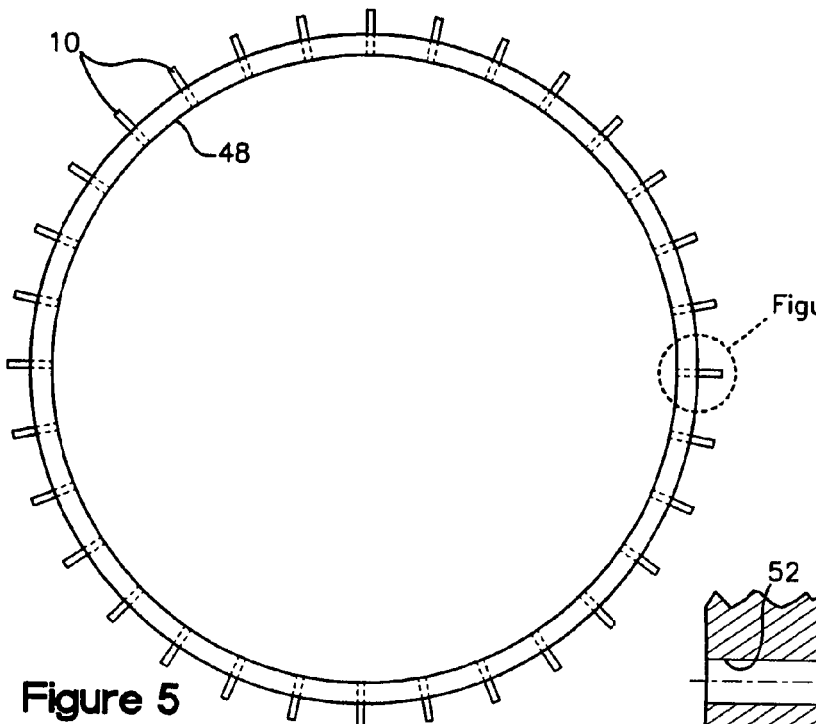
FIG. 5 is an isolated front view of a part of the machine, namely an adapter rim.
Figure 6:
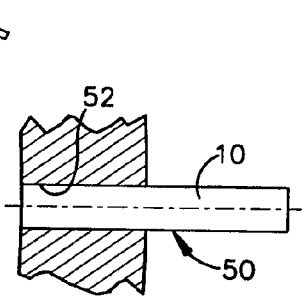
FIG. 6 is an enlarged portion of FIG. 5.
Figure 7:
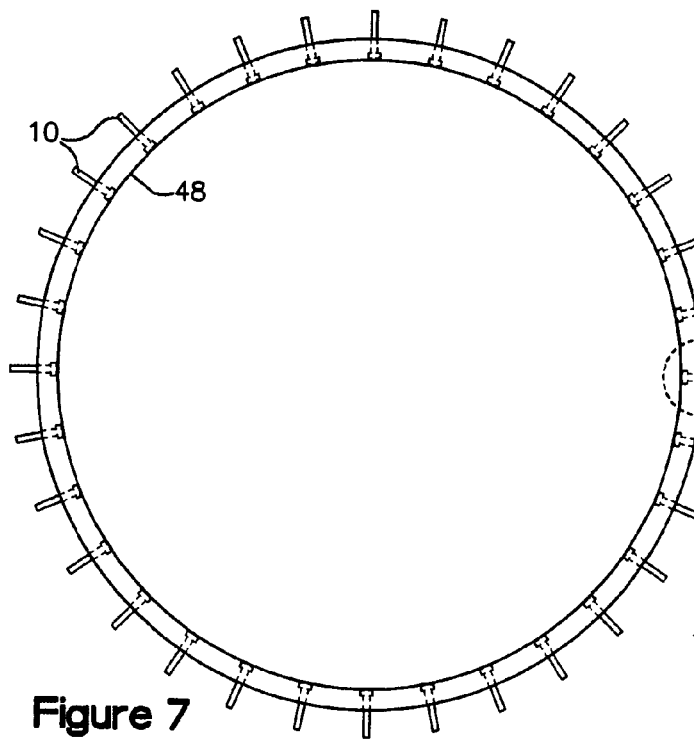
FIG. 7 is an isolated front view of another adapter rim.
Figure 8:
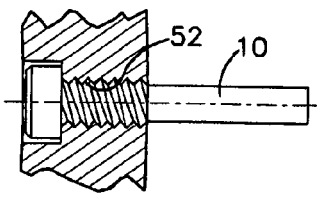
FIG. 8 is an enlarged portion of FIG. 7.
Figure 9A:
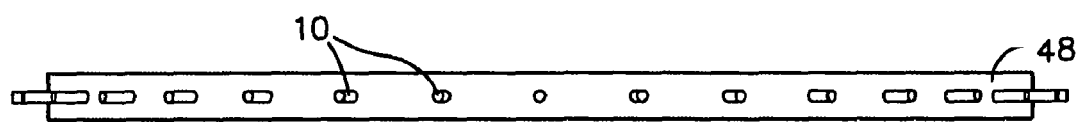
FIGS. 9A-9C are top views of alternate forms of the adapter rim.
Figure 9B:
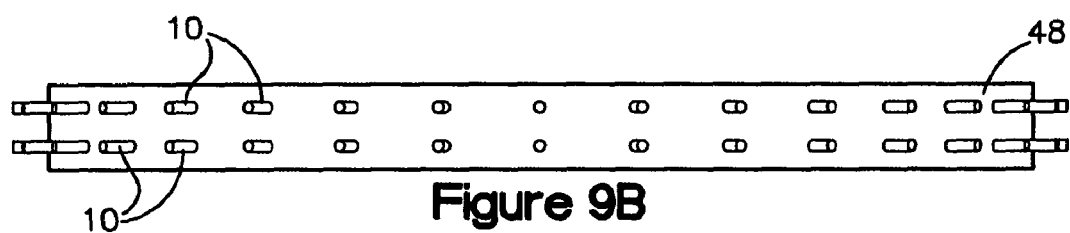
Figure 9C:
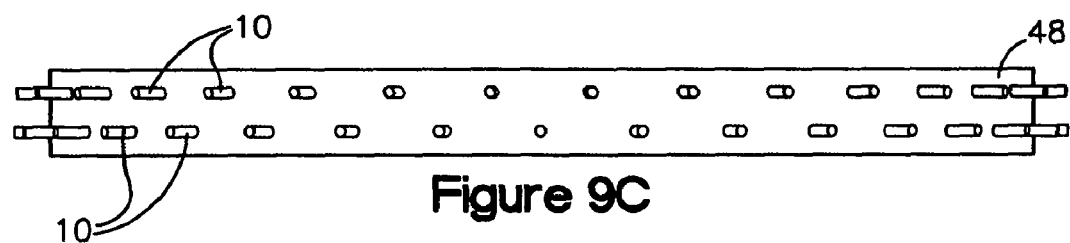

In the illustrated embodiment, the pins 10 are part of an adapter rim 48 which is wrapped around the wheel 44. The pins 10 can comprise the distal portions of posts 50 which are friction fit into openings 52 in the rim 48. (See FIGS. 5 and 6.) Alternatively, the pins 10 can comprise the distal portions of socket head cap screws 50 and the openings 52 in the rim 48 can be threaded and counterbored for receipt thereof. (FIGS. 7 and 8.) The pins 10 can be arranged in a single row (FIG. 9A) or a plurality of rows (FIGS. 9B and 9C). If arranged in a plurality of rows, the pins 10 can be transversely aligned (FIG. 9B) or staggered (FIG. 9C). In any case, the pins 10 can be textured to facilitate the coating process.

The supply system 26 comprises a tank 60, a bracket 62 that fixedly mounts the tank 60 to the lift bar 38, a transfer reel 64, and a spindle 66 that rotatably mounts the reel 64 to the lift bar 38. The tank 60 contains the electrically conductive material M and a belt 68 connects the spindle 46 to the spindle 66 so that turning of the wheel 44 will result in rotation of the reel 64. The transfer reel 64 includes a slot which captures the material M as it passes through the tank 60 and which receives the pins 10 as the reel 64 passes by the wheel 44.

Accordingly, as the tread T is linearly moved by the conveyor 28, the wheel 44 is turned. As the wheel 44 turns, the transfer reel 64 also rotates whereby the material M from the tank 60 is coated on the pins 10. The turning of the wheel 44 also causes the coated pins 10 to pierce the tread T at regular intervals, and, further turning of the wheel 44 causes the pin 10 to be withdrawn with the material M remaining in the pierced opening. As the wheel 44 continues to turn, the pins are re-coated with the material M and the cycle repeated.

Although the invention has been shown and described with respect to a certain preferred embodiment, obvious and/or equivalent alterations and modifications will occur to others skilled in the art upon the reading and understanding of this specification. The present invention includes all such equivalent alterations and modifications and is limited only by the scope of the following claims.

The invention claimed is:

1. An apparatus for introducing a material into an article, the apparatus comprising:
   a frame;
   a wheel rotatably mounted to the frame;
   a plurality of pins mounted on the wheel and disposed radially outward therefrom; and
   a supply system positioned adjacent to the wheel and configured to coat at least one pin with the material,
   wherein the supply system includes a transfer reel rotatably mounted to the frame,
   wherein the transfer reel includes at least one slot which receives the pins and contains the material so that at least one pin can be coated with the material as the reel passes by the wheel, and
   wherein, upon rotation of the wheel, at least one pin coated with the material pierces the article, thereby leaving at least a portion of the material in the article after the pin is withdrawn therefrom.

2. The apparatus of claim 1, wherein the transfer reel is rotatably mounted to the frame and is coupled the wheel, such that turning of the wheel causes rotation of the transfer reel.

3. The apparatus of claim 1, wherein the transfer reel slot captures the material as it passes through the supply system.

4. The apparatus of claim 1, further comprising a conveyor, wherein movement of the article on the conveyor causes the wheel to turn.

5. The apparatus of claim 1, wherein the pins are arranged in a single row.

6. The apparatus of claim 1, wherein the pins are arranged in a plurality of axially spaced rows.

7. The apparatus of claim 6, wherein the pins in each row are transversely aligned.

8. The apparatus of claim 6, wherein the pins in each row are transversely staggered.

9. The apparatus of claim 1, wherein the frame further comprises a lift for raising and lowering the wheel relative to a conveyor for moving the article.

10. The apparatus of claim 9, wherein the lift further comprises a lift bar and at least one guide rod attached to the lift bar and the frame.

11. The apparatus of claim 10, wherein the wheel is rotatably mounted to the lift bar.

12. The apparatus of claim 1, wherein the supply system further comprises a tank that contains the material.

13. The apparatus of claim 1, wherein the wheel is positioned above the article.

14. An apparatus for introducing electrically conductive material into a tire tread, the apparatus comprising:
   a frame having a lift mechanism;
   a wheel rotatably mounted to the lift mechanism such that the wheel is configured to be raised and lowered;
   a plurality of circumferentially spaced pins mounted on the wheel and disposed radially outward therefrom; and
   a supply system positioned adjacent to the wheel and configured to coat at least one pin with the electrically conductive material,
   wherein the supply system includes a transfer reel rotatably mounted to the frame,
   wherein the transfer reel includes at least one slot which receives the pins and contains the material so that at least one pin can be coated with the material as the transfer reel passes by the wheel, and
   wherein, upon rotation of the wheel, at least one pin coated with the electrically conductive material pierces the tire tread, thereby leaving at least a portion of the electrically conductive material in the tire tread after the pins are withdrawn therefrom.

15. The apparatus of claim 14, wherein the transfer reel is rotatably mounted to the frame and is coupled to the wheel, such that turning of the wheel causes rotation of the transfer reel.

16. The apparatus of claim 14, wherein the transfer reel slot captures the electrically conductive material as it passes through the supply system.

17. The apparatus of claim 14, wherein the supply system includes a tank that contains the electrically conductive material.

18. The apparatus of claim 14, wherein one or more of the pins include a textured portion to facilitate the coating process.

19. The apparatus of claim 18, wherein the textured portion includes a diamond knurl.

20. The apparatus of claim 14, wherein the wheel is positioned above the tire tread.

* * * * *